Dec. 30, 1924.
C. F. JENKINS
PRISM LENS DISK
Filed Sept. 11, 1922
1,521,191
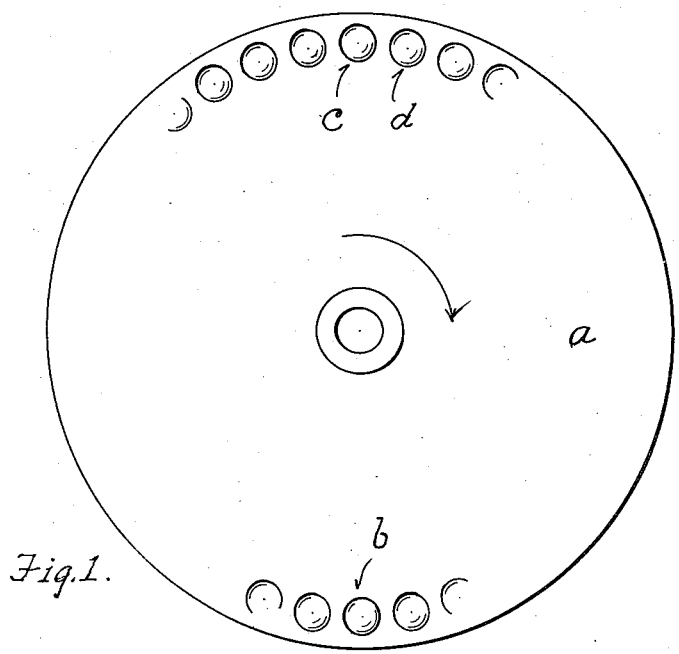
Fig.1.
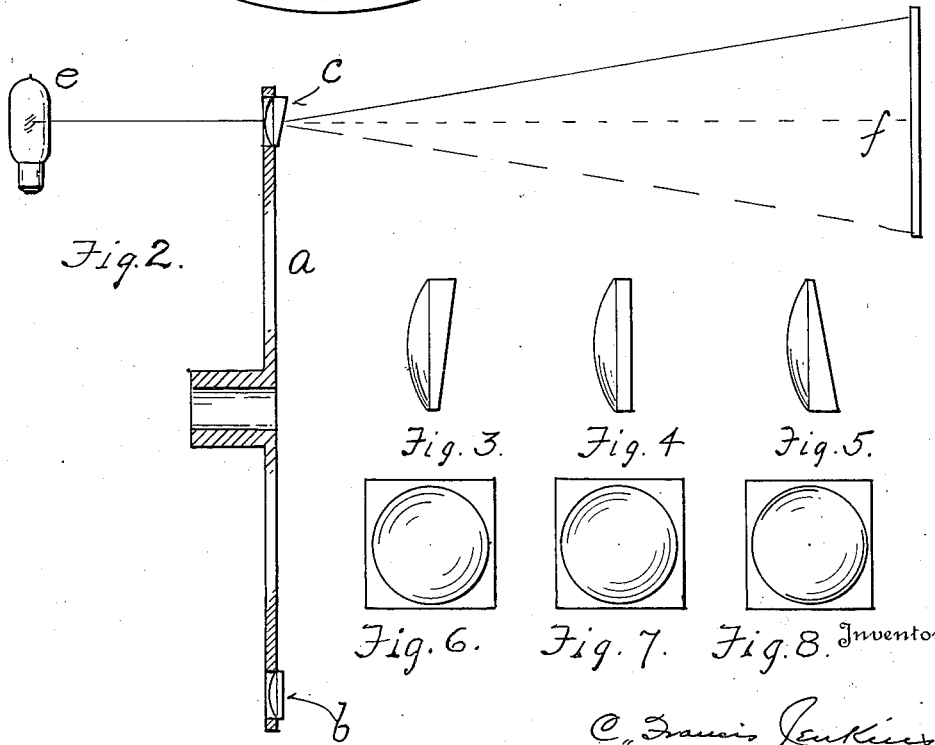
Fig.2.
  
Fig.3.   Fig.4.   Fig.5.
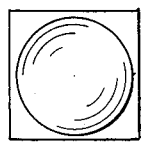 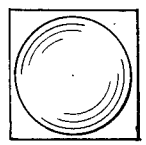 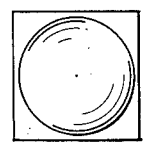
Fig.6.   Fig.7.   Fig.8.
Inventor
C. Francis Jenkins
By
Attorney Patented Dec. 30, 1924.

1,521,191

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

PRISM-LENS DISK.

Application filed September 11, 1922. Serial No. 587,522. REISSUED

*To all whom it may concern:*

Be it known that I, CHARLES FRANCIS JENKINS, a citizen of the United States, residing at Washington, District of Columbia, have invented certain new and useful Improvements in Prism-Lens Disks, of which the following is a specification.

This invention relates to apparatus for the transmission of pictures-by-radio, in which apparatus the picture is made up of lines of light crossing a picture surface, said lines of light having greater or less density in different parts of the line. The principal object of the invention is to permit a much higher speed than is possible with apparatus heretofore proposed for the purpose.

In the drawings, Fig. 1 is a lens-prism carrier; Fig. 2 a sectional view of the same; Figs. 3, 4, 5, 6, 7 and 8 edge and face views of the individual lens-prisms. In the drawings like symbols refer to like parts, A being the disk-lens-prism carrier; B the lens-prism element shown in Figs. 4 and 7; C the lens-prism shown in Figs. 3 and 6; D the lens-prism shown in Figs. 5 and 8; each lens-prism element may be made up of a plain-faced prism upon one face of each of which a lens is mounted, or it may be made in a single piece; E is a source of light; and F a light receiving surface.

The object sought is to cause the point of the pencil of light from E passing through C and crossing the light-receiving surface F from one of its sides to the other, and in succession from top to bottom once for each revolution of the disk A. This object is accomplished in the device shown by reason of the fact that each prism crossing the pencil of light (from the lamp E) has in succession a less and less angle between its faces than has prism C, which latter has its base outward and which may be considered as beginning the series of lines. When the disk A has made a half revolution, the prism B is brought into the line of the pencil of light, and as this "prism" has parallel sides the light is not deflected at all but passes straight through and falls upon the middle of the light-receiving surface, shown by the dotted line.

As the disk continues to rotate the prism angle increases in each succeeding prism with its base inward until prism D is reached, which prism has the same angle as prism C, but with its base in the reverse direction. This last prism causes the line of light to fall upon the picture surface along the dashed line.

What I claim, therefore, is—

1. In apparatus of the class described, a rotating carrier having peripherally mounted thereon a plurality of prism-faced lenses, each prism of the prism lens element, in succession upon the carrier, having a different angle from the adjacent prism of the prism-lens element.

2. In apparatus of the class described, a rotating carrier having peripherally arranged thereon a plurality of like lenses, and in the optical axis of each of which is a prism, each prism having successively a different angular value from the adjacent prisms the prism mounted to rotate with the lens.

3. In apparatus of the class described, a rotating peripherally apertured disk, means supporting lenses in line with each aperture, and a separate prism being located in the optical axis of each lens the prisms having different angles.

4. In apparatus of the class described, a peripherally apertured disk, means supporting a lens, a prism in line with each aperture, a light source, and a light receiving surface, both so located that light from the source will fall on the receiving surface after passing through the lenses and prisms in succession.

In testimony whereof I have affixed my signature.

CHARLES FRANCIS JENKINS.